Patented Apr. 11, 1961

2,979,535

PROCESS FOR THE MANUFACTURE OF ALKINOLS AND ALKINE DIOLS

Kurt Sennewald and Armin Gotz, Knapsack, near Koln, and Heinrich Rehberg, Hermulheim, near Koln, Germany, assignors to Knapsack-Griesheim Aktiengesellschaft, Knapsack, near Koln, Germany, a corporation of Germany No Drawing. Filed Oct. 21, 1958, Ser. No. 768,573

Claims priority, application Germany Oct. 29, 1957

13 Claims. (Cl. 260—635)

The present invention relates to a process for the manufacture of alkinols and alkine diols.

It is known to prepare alkinols or alkine diols by reacting ketones or aldehydes at a low temperature and in the presence of alkali metals or sodium amide, acetone sodium, acetylene sodium or the corresponding compounds of other alkali metals in ether or liquid ammonia with acetylene or acetylene derivatives containing at least one hydrogen atom at the acetylene group. It is, however, expensive to bring about the low temperatures that are required.

It has also been proposed to react calcium carbide with KOH and acetone in ether. Besides, it is known to carry out the reaction under the catalytic action of heavy metal acetylides of the first and second groups of the periodic table. The aforesaid reaction takes a smooth course only when aldehydes are used; when ketones are used the reaction proceeds but very slowly.

It is also known to carry out the reaction of ketones with acetylene in solvents such as acetals, ketals or ethylene glycol alkyl ethers which are capable of forming addition complexes with the KOH that has been added. Such complexes react easily with acetylene, however, the solvents that are required are expensive and not very stable compounds.

Furthermore, it is known to carry out the reaction in high boiling solvents. In this case, it is necessary, however, to add alkali metal alcoholates of saturated primary or secondary alcohols as condensing agents. The aforesaid process has the drawback that it is difficult to separate the final products desired from the alcoholic component that has been added.

Now, we have found that the addition of the alcoholic component enolizing the ketone can also be dispensed with and that, if the process is carried out in an appropriate manner, such a primary enolization is not necessary for the addition reaction of the ketone with acetylene or the acetylene compound.

The process of the present invention which is directed to the manufacture of alkinols and alkine diols comprises several stages. In the first stage, acetylene or acetylene derivatives containing at least one hydrogen atom at the acetylene group are caused to act upon KOH which is suspended in a chemically inert solvent and which has been to a great extent freed from water by a distillation by heating. In the second stage, the ketone is added to the reaction mixture, if desired, while continuing the introduction of acetylene or the acetylene derivative. In the third stage, the mixture is hydrolyzed. The organic layer is then separated and worked up by distillation. During the first stage, potassium acetylide which promotes the reaction taking place in the second stage is formed.

The ketone which, apart from the desired final product, forms during the separation by distillation carried out in the third stage of the process and which has not been completely reacted can be returned in a cycle to the reaction.

When commercial KOH containing water is used, it is of particular advantage to carry out the reaction in solvents that are capable of forming an azeotrope with water. As solvents there may more especially be used hydrocarbons, for example, those having a boiling range of about 100° C. to about 180° C. for example aromatic substances, such as toluene, ethyl benzene, cumene, cymene and the different xylenes, and cycloaliphatic or aliphatic hydrocarbons, such as decahydronaphthalene, octane, decane or mixtures thereof, such as gasoline fractions having a comparatively high boiling point, viz. a boiling point within the range of about 100° C. to about 180° C. The azeotrope consisting of solvent and water can, if desired, be distilled off at the same time as acetylene or the acetylene derivative is introduced.

The reactions, at least those taking place in the first and second stages of the process, are advantageously carried out while stirring. In the first stage a temperature within the range of about 0° C. to about +130° C. is applied, the temperature to be applied depending on the solvent used and on the acetylene derivative. If monosubstituted acetylene compounds are used, low temperatures are applied whereas, when acetylene is used, temperatures of up to about 130° C. have to be applied. In the second stage of the process, in which the ketone is added, the temperatures applied are within the range of about —10° C. to about +80° C. In general the temperature applied in the second stage is lower than that applied in the first stage. The mixture may be allowed to cool already during the introduction of acetylene, by the end of the first stage of the process, but not before the azeotrope consisting of solvent and water has been distilled off.

Besides acetylene there may be used as acetylene derivatives, for example, monovinyl acetylene or similar compounds. It is, however, necessary that these compounds should contain a hydrogen atom at the acetylene group. As ketones suitable for use in the process of the present invention there may be mentioned, for example, acetone, methyl-ethyl-ketone, diethyl ketone, methyl-isobutyl-ketone, pentanone-2, and similar compounds.

When carrying out the process of the present invention, it is of advantage to use pulverulent potassium hydroxide that has previously been freed from water.

With reference to the process of the invention, the following details remain to be mentioned:

The solvents applied are chemically inert, stable and cheap. Consequently, they do not disturb the course of the reaction and they can easily be separated from the final product whereby the process can be carried out in a very economical way. The solvent which, for example, forms an azeotrope with water is heated after the addition of KOH until the KOH added melts and the excess amount of water is distilled off whereby the potassium hydroxide is dehydrated until its content of water amounts to no more than about 12 percent by weight. At the same time the whole is thoroughly stirred and acetylene may already be introduced while the mixture is stirred whereupon part of the KOH is probably converted into potassium acetylide. The ketone is then added at a low temperature with stirring and, if the whole amount of acetylene has not yet been added, while introducing acetylene. The degree of temperature chosen for the introduction of the ketone depends on the acetylene derivative, the ketone used and the final product desired, that is to say, upon whether the formation of alkinol or alkine diol is desired. When an elevated temperature is applied, it is preferably alkine diols that are formed whereas when temperatures within the range of —10% C. to about +10°

C. are applied, it is preferably alkinols that form and the addition reaction of the ketone with acetylene or the acetylene derivatives stops at the formation of the aforesaid compounds. When the reaction is complete, the potassium salt of the alkinol or alkine diol which has formed is hydrolyzed with water or acid and the organic layer is separated and processed by distillation. The pressure maintained during reaction should be within the range of about atmospheric pressure up to about 10 atmospheres (gauge pressure), preferably up to 5 atmospheres (gauge pressure).

The following examples serve to illustrate the invention but they are not intended to limit it thereto:

Example 1

1200 cc. of xylene and 300 grams of solid KOH were heated to the boiling point of xylene, the KOH melting, depending on the amount of water it contained, at a temperature within the range of about 100° C. to 115° C. The water that was set free was distilled off at about 135° C. as an azeotrope of xylene and water while stirring. At the same time, acetylene was already introduced under a pressure of about 8 atmospheres (gauge). The mixture was then allowed to cool while the stirring and the introduction of acetylene were continued thereby maintaining a pressure of at least 5 atmospheres (gauge). At −2° C., 120 grams of acetone were introduced into the mixture in the course of about 4 hours. The reaction mixture which was thinly liquid in the beginning changed into a thickly liquid paste at the end of the reaction. The pressure, then, was allowed to drop and the mixture was hydrolyzed with 500 cc. of ice water. The layers were then separated and the organic portion was distilled. 16 grams of acetone were recovered and apart from the solvent 150 grams of 2-methylbutine-3-ol-2 were obtained as main product. About 1 percent of the originally used acetone was converted into 1.1.4.4-tetra-methyl-butine-2-diol-1.4 and into higher condensation products of acetone. The total yield of 2-methylbutine-3-ol-2 amounted to 98 percent when the acetone was conducted in a cycle, the extent of conversion amounted to 87 percent when a single reaction was carried out, the percentages being calculated on the acetone used.

Example 2

1500 cc. of xylene and 400 grams of commercial anhydrous KOH were heated under reflux and with the introduction of acetylene to about 135° C., while stirring thoroughly. 300 grams of acetone were then added dropwise at 50° C. in the course of 6 hours. When the reaction was complete, the mixture was hydrolyzed and the organic layer was distilled. 58 grams of acetone were recovered. After distilling off the main portion of xylene 225 grams of 1.1.4.4-tetramethyl-butine-2-diol-1.4 were obtained as the final product desired. Besides, 52 grams of 2-methyl-butine-3-ol-2 formed. The total yield amounted to 91 percent when the starting material, acetone, was conducted in a cycle, the extent of conversion amounted to 81 percent, the percentages being calculated on the acetone used.

Example 3

1500 cc. of decahyronaphthalene and 400 grams of pulverulent potassium hydroxide which had been freed from water at 600° C. and which contained 97.5 percent of KOH, 2 percent of $K_2CO_3$ and 0.5 percent of $H_2O$ were heated to 80° C. and saturated with acetylene. The mixture was cooled to 0° C., while stirring and introducing acetylene and within 7 hours 290 grams of methyl ethyl ketone were added dropwise. When the reaction was complete the mixture was hydrolyzed with 700 cc. of ice water, the organic layer was separated and distilled. 318 grams of 2-ethylbutine-3-ol-2 having a boiling range of 118 to 122° C. were obtained. 30 grams of methyl-ethyl-ketone were recovered and returned in a cycle to the reaction.

Example 4

1200 cc. of a gasoline fraction having a boiling range of 150 to 180° C. were heated under reflux and while stirring with 300 grams of commercial KOH, the excess of water being distilled off until the potassium hydroxide contained but 13 percent of water. While the mixture was cooled to 0° C. acetylene was introduced and 260 grams of diethyl ketone were added dropwise at +1° C. within 6 hours. When the introduction of ketone was complete the mixture was allowed to react for another hour, while stirring, and subsequently it was hydrolyzed with 600 cc. of ice water. The organic layer was separated and distilled. 266 grams of diethyl ethinyl carbinol having a boiling range of 135 to 140° C. and 44 grams of unreacted diethyl ketone which was to be used again were obtained.

Example 5

1500 cc. of xylene and 400 grams of solid potassium hydroxide were heated to the boil, while stirring, the KOH being dehydrated until it contained about 13 percent of water. The mixture was then cooled to +6° C., while stirring, and monovinyl acetylene was introduced. Subsequently 236 grams of acetone were added dropwise within 6 hours. When the addition of the ketone was complete, the mixture was hydrolyzed with 700 cc. of ice water and the upper layer was separated and distilled. Apart from 71 grams of acetone that had not been consumed, 288 grams of 2-methyl-hexene-5-in-3-ol-2 having a boiling range of 41 to 43° C. under a pressure of 3 mm. of mercury were obtained.

We claim:

1. A process for the manufacture of at least one substance selected from the group consisting of alkinols and alkine diols, which consists of reacting in a first stage at least one substance selected from the group consisting of acetylene and acetylene derivatives containing at least one hydrogen atom at the acetylene group, with potassium hydroxide suspended in a hydrocarbon as a chemically inert solvent which hydrocarbon boils between 100° to 180° C., said suspension having been substantially freed from water by distilling off the water together with a part of said solvent, adding an acyclic aliphatic ketone having 3 to 6 carbon atoms to the reaction mixture in a second stage, said ketone being added dropwise over a period of at least four hours, hydrolyzing the mixture in a third stage, separating the organic layer, and processing said layer by distillation.

2. The process as claimed in claim 1, wherein at least one substance selected from the group consisting of acetylene and acetylene derivatives is introduced into the reaction mixture also during the second stage of the process.

3. The process as claimed in claim 1, wherein unreacted portions of the ketone are recycled into the reaction.

4. The process as claimed in claim 1, in which the solvent used is capable of forming an azeotrope with water.

5. The process as claimed in claim 1, in which the solvent is xylene.

6. The process as claimed in claim 1, wherein the reaction medium is stirred at least during the first and second stages of the process.

7. The process as claimed in claim 1, wherein the first stage of the process is carried out at a temperature within the range of about 0° C., to about 130° C.

8. The process as claimed in claim 1, wherein the second stage of the process is carried out at a temperature within the range of about −10° C. to about +80° C.

9. The process as claimed in claim 1, wherein the pressure maintained during the reaction is within the range of about atmospheric pressure up to about 10 atmospheres (gauge pressure).

10. The process as claimed in claim 1, in which the acetylene derivative is monovinyl acetylene.

11. The process as claimed in claim 1, in which the ketone is at least one substance selected from the group consisting of acetone, methyl ethyl ketone and diethyl ketone.

12. The process as claimed in claim 1, wherein the potassium hydroxide is dehydrated in the first stage of the process until it contains not more than about 12 percent by weight of water.

13. The process as claimed in claim 1, wherein pulverulent potassium hydroxide is used that has previously been freed from water.

References Cited in the file of this patent

UNITED STATES PATENTS

| | | |
|---|---|---|
| 2,385,546 | Smith | Sept. 25, 1945 |
| 2,385,547 | Smith | Sept. 25, 1945 |